March 21, 1933.　　　　J. TATE　　　　1,902,270
MITER GAUGE
Filed June 2, 1932　　　3 Sheets-Sheet 1
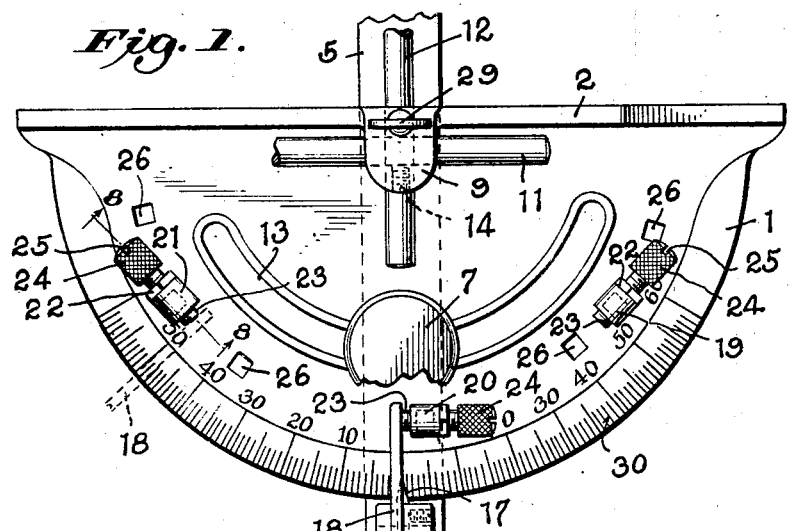
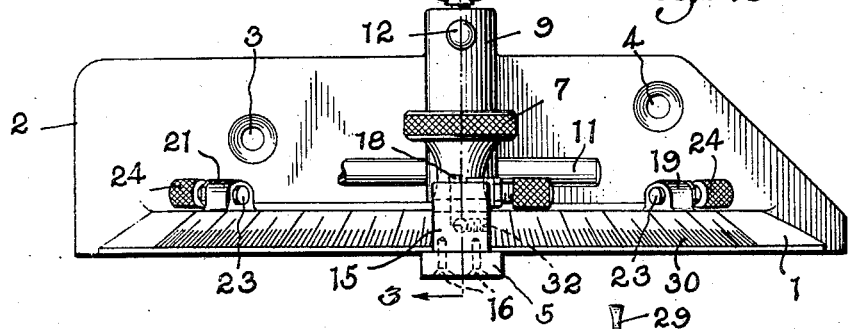
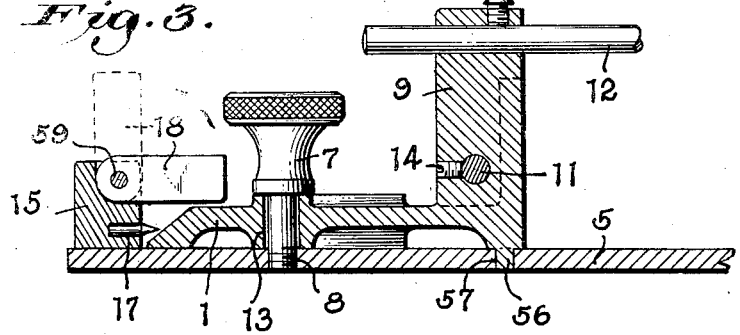
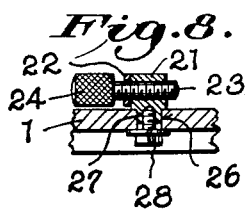
Inventor
JAMES TATE
By Carl A. Hellmann
Attorney March 21, 1933. J. TATE 1,902,270
MITER GAUGE
Filed June 2, 1932 3 Sheets-Sheet 2

JAMES TATE Inventor

By Carl A. Hellmann
Attorney

March 21, 1933.   J. TATE   1,902,270
MITER GAUGE
Filed June 2, 1932   3 Sheets-Sheet 3
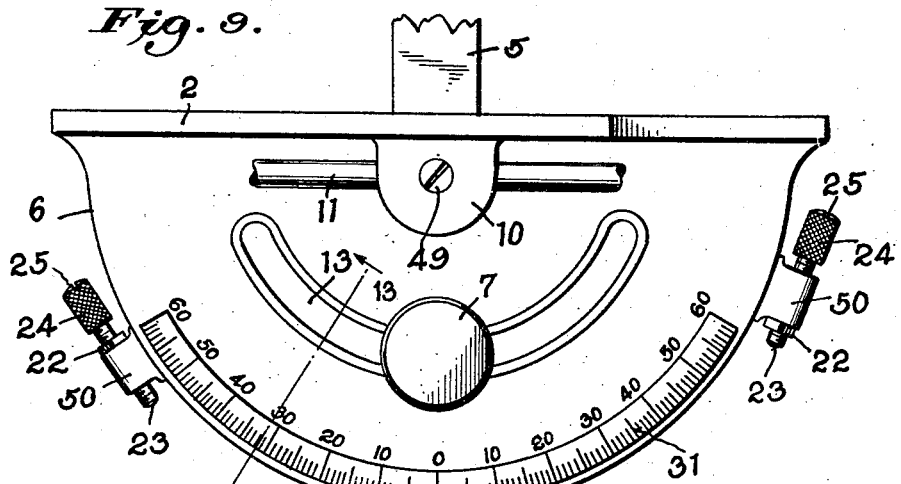
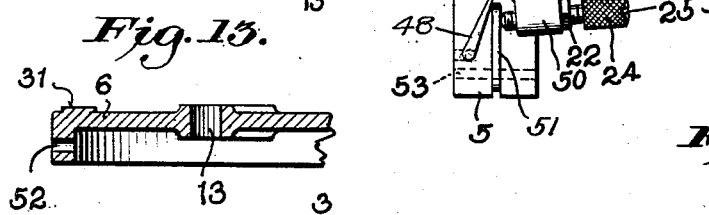
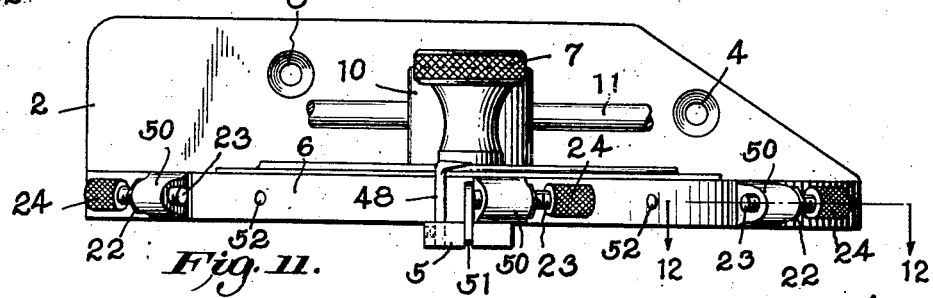
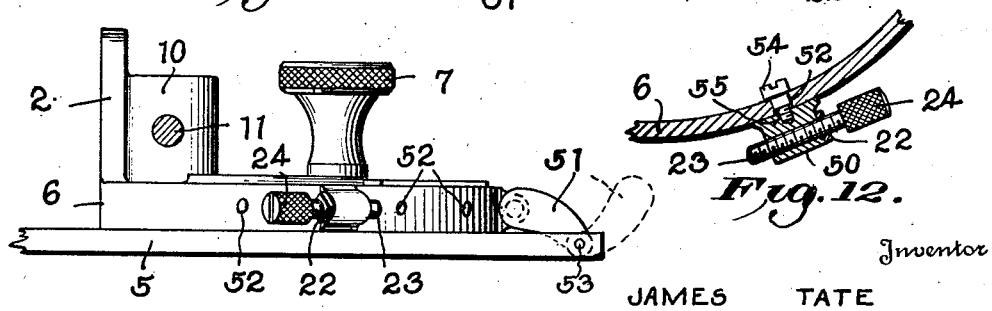
Inventor
JAMES TATE
By Carl A. Hellmann
Attorney Patented Mar. 21, 1933

1,902,270

UNITED STATES PATENT OFFICE

JAMES TATE, OF MILWAUKEE, WISCONSIN, ASSIGNOR TO DELTA MANUFACTURING COMPANY, OF MILWAUKEE, WISCONSIN

MITER GAUGE

Application filed June 2, 1932. Serial No. 615,049.

My invention relates to miter gages, that is, to devices particularly intended to be used in cooperation with motor-driven or other tools, to position work pieces in proper angular relation to the cutter or other active member of the tool, for the operation which is to be performed on the work pieces.

While such devices are commonly known in practice by the name of miter gages, it is evident that they are not restricted to use in mitering operations alone, but are of general application in guiding work pieces at the proper angles, and are of course capable of use also as protractors, that is, devices for laying out or defining certain angles. In general, therefore, the device to which my invention relates may be described as a mathematical instrument.

In devices of this type it has heretofore been usual to rely upon a device carrying an arcuate scale which is graduated into divisions representing degrees of angle, in cooperation with a pointer carried by a bar, in order to indicate the angular relationship existing between the bar and the device which carries the arcuate scale. In order to set said gage to a certain angle it was then customary merely to adjust the position of the bar with respect to the other member until the pointer indicated the desired angle.

This, however, led to slight errors in practice: first, because of parallax due to the fact that the pointer and scale were usually not in direct contact with one another; second, because of errors due to the fact that the graduation lines in practice have some width, that is, they are not ideal geometric lines, and, therefore, some question always arose as to just which edge of the graduation line should be used in making a reading, and a similar ambiguity resided in the fact that the tip of the pointer was not a true mathematical point, thus further adding to the possible error in reading; third, a still further error resulted due to personal variations in the user of the device, in that he would not always use the same standard in making his readings.

It is an object of the present invention to eliminate such errors, particularly as to certain definite angles which are often used, such as 0°, and various fractions of $\pi$, such as 30°, 45°, 60°, etc., which are commonly employed in machining articles as well as in laying out work or in drafting operations.

In order to accomplish this, my invention contemplates providing one or more definite stops or abutments upon one element of the miter gage arranged to cooperate with a corresponding stop or the like mounted upon the other element of the miter gage, so that when these stops or abutments are brought into contact, certain definite angular relations will exist between the positions of the gage members. These definite positions may thus be produced or reproduced readily at will, and without the need of any reading or setting on the part of the operator, after the abutments or stops have once been properly adjusted to the desired positions.

A further object is to provide means whereby the abutments may be adjusted accurately into desired proper positions, and clamped therein to prevent subsequent derangement.

A still further object is to provide one or more abutment members or lugs which may be secured to the miter gage at selected positions, at the will of the user, in place of providing lugs or abutment stops made integral with the gage member.

A still further object is to provide a stop on the other element or member of the gage, which cooperates with the abutments, and is so arranged that it may be adjusted at will, either to cooperate with the stationary abutments on the first member, or to pass by them freely, when it is not desired to make use of the particular angles for which the said stationary abutments are set. This may be done by providing a pivoted or slidable stop element on one gage member, to cooperate with the relatively stationary abutments on the other.

Other objects and advantages of my invention will appear from the following specification, in connection with the accompanying drawings which illustrate several embodiments of my invention, by way of example.

In said drawings:

Fig. 1 is a plan view of one form of gage embodying my improvements.

Fig. 2 is a front elevation thereof.

Fig. 3 is a sectional view thereof on the plane indicated by line 3—3 of Fig. 2, looking in the direction of the arrows.

Fig. 8 is likewise a partly sectional elevation, on the plane indicated by the line 8—8 of Fig. 1, of a similar abutment or lug adapted to be used in the Fig. 1 type.

Fig. 9 shows another modification of the gage, in plan view.

Fig. 10 is a front elevation of the modification shown in Fig. 9.

Fig. 11 is a side elevation thereof, the rod being shown in section and the bar being partly broken away.

Fig. 12 is a partly sectional detail view, on the plane indicated by the line 12—12 of Fig. 10, looking in the direction of the arrows, showing the construction of an abutment, which may be used in this type of gage, and Fig. 13 is a fragmentary sectional view on the plane indicated by the line 13—13 of Fig. 9, illustrating the shape of the body of the gage.

Figure 4:
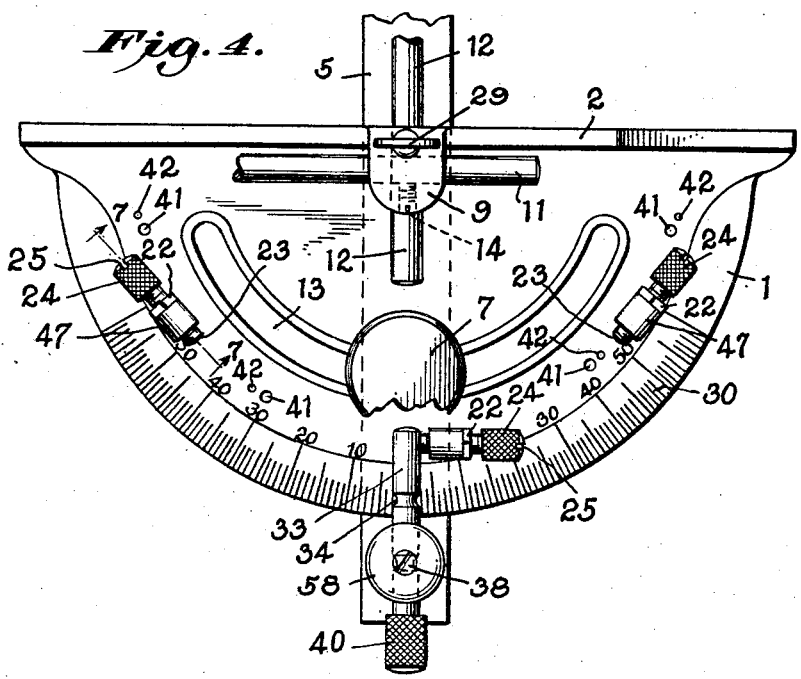
Fig. 4 is a plan view of a modified form of gage embodying my invention.
Figure 5:
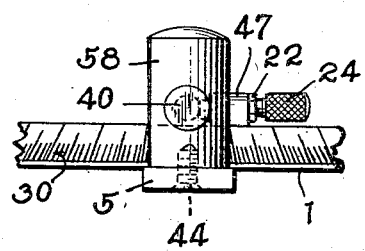
Fig. 5 is a fragmentary front elevation corresponding to Fig. 4.

Referring first to the form of gage illustrated in Fig. 1, it will be noted that the same consists primarily of two elements, namely, the body 1, which is substantially flat and semicircular, and may have a vertical flange 2 at its rear or substantially diametral edge, and a bar 5, pivoted to said body 1 about an axis passing through the center of the semicircle. The upright or vertical portion 2 of the body may be provided with countersunk holes, such as 3 and 4, to make it possible to secure a piece of wood or the like thereto in the practical use of the gage.

The bar 5 is pivoted about the aforesaid axis through the center of the semicircle, as shown in Fig. 3, by providing a lug 56 on the body 1, fitting into a bore 57 located at a suitable point in the bar 5. The body 1 may be provided with a series of graduations on a beveled portion, as shown at 30, said graduations preferably indicating degrees of angle, and cooperating with a pointer 17 secured in a post 15, attached to the bar 5, to indicate the angular adjustment of the bar 5 with respect to the flange 2 of the gage. In the particular gages illustrated in the present case, this pointer reads the complement of the said angle, that is, the reading will be zero when the bar 5 is at right angles to the flange 2. The post 15 may be integral with, or secured to, the bar 5 in any suitable manner, for example, by the screws or other fastening means indicated in dotted lines in Fig. 2, at 16. The pointer 17 may be secured in said post by means of a screw 32, threaded into the post 15.

In order to secure the body member 1 to the bar 5 at any desired position, an arcuate slot 13 may be provided in said body portion 1, and a screw 7, having a knurled head, may be threaded into a correspondingly threaded hole 8 in the bar 5, as shown in Fig. 3. Upon loosening the screw 7 it is obvious that the bar 5 may be turned about its pivot 56 until the pointer 17 shows the desired reading on the scale 30, whereupon the screw 7 may be tightened to retain the body and the bar in their adjusted positions.

For the sake of completeness of the description of the device, it may be mentioned that a length-gage rod 11 may be provided which passes through a lug or post 9, which is located upon the body 1 adjacent to, and preferably integral with, the flange 2. This lug thus serves not only to brace or strengthen the member 1, but also to support the gage rod 11, which forms no part of the present invention. This rod 11 may be secured in any desired position by means of the screw 14. A further rod 12, passing through the lug 9, at some distance above the top of the flange 2, may also be provided, and secured by a thumb screw 29 or the like. This rod also is illustrated merely for the sake of completeness, and appears in a preferred form of the gage, but does not constitute a portion of the present invention, and, therefore, is not discussed further herein, except to state that it is a part of means for holding the work piece to the gage.

Attention is now directed to the stop screws 23, which are mounted in the lugs 19, 20, and 21, of Fig. 1. Each of these screws has a lock nut 22 cooperating therewith to secure it in adjusted position with respect to the corresponding lug or abutment, and each of the screws preferably has a knurled head 24 whereby it may be manipulated readily by the fingers, as well as a slot 25, which may cooperate with a screw driver when the screws are to be adjusted in their respective lugs.

While the lugs or abutments may be made integral with the base 1 or be permanently secured thereto in any desired manner, as shown for example in Fig. 2, at 19 and 21, it is also possible to provide means whereby these lugs may be shifted into selected predetermined positions. This may be accomplished in the Fig. 1 type of gage by providing a series of polygonal apertures, such as 26, in the body, and which are here shown as rectangular or square holes, and by providing correspondingly shaped extensions 27 on the ends of the lugs 19, 20, and 21, adapted to fit into said apertures, as best shown in Fig. 8. The lugs will thus be retained against shifting or turning by reason of the polygonal shapes of the contacting parts, and may be secured in the desired apertures by means of screws 28 threaded into the extensions 27, as best shown in Fig. 8. While three such lugs or abutments have been illustrated, it is obvious that it is not necessary that three should be present, and either more or less than three may be used in any particular case if preferred.

It will be noted that each of the screws 23 threaded through the said lugs is provided with a flat end, which is preferably arranged in a plane passing substantially radially through the corresponding graduation adjacent to the said end of the screw. A link 18 which is arranged within a slot in the post 15, and secured pivotally by means of a pin 59, may be moved about said pin 59 into the position shown in full lines or that shown in dotted lines in Fig. 3. When the link is in the position shown in full lines in Figs. 1, 2 and 3, it is obvious that it will strike against the end of one of the screws 23 when the bar 5 is swung far enough about its pivot 56. The link 18 as shown in Fig. 1 has one of its vertical surfaces arranged in line with the end of the pointer 17, and it is clear that if the screw 23 which passes through the lug 20 is adjusted accurately, it is possible to cause the said screw to cooperate with the link to definitely position the bar 5 in a position at right angles to the flange 2, namely, the position shown in Fig. 1. This may be done, for example, by applying a try-square or drafting triangle or similar implement having a definite right angle configuration, to the edges of the bar 5 and the flange 2, respectively, and then adjusting the screw 23 in the abutment 20 until the end of the screw just comes into contact with the adjacent surface of the hinged or pivoted link 18.

It is obvious that the other lugs 21 and 19 may similarly be adjusted to any desired angles, for example, the lug 21 in the position shown in Fig. 1 might be adjusted so that the screw 23 thereof would make contact with the adjacent surface of the link 18, when in the position indicated in dotted lines, when the bar 5 is swung so as to make an angle of exactly 45° with the flange 2, by applying a 45° angle of a drafting triangle to the bar 5 and the flange 2. However, for illustrative purposes, the adjustment shown in Fig. 1 will provide an angle of 48°, instead of 45°, and this adjustment may be that desired, for example, in the particular machine operation for which the gage is set. In other words, the angles for which the abutments and screws 23 are adjusted need not necessarily be simple fractional parts of $\pi$, but may be any other arbitrary angles equally well. It is clear that when it is not desired to make use of the swinging link 18 to act as a stop in cooperation with the screws 23, it may be swung into the dotted line position, shown in Fig. 3, and in such position the gage may be used in the ordinary way by reading the approximate angle on the scale 30 by means of the pointer 17. In this way it becomes possible to adjust the screws 23 to certain much used angles, and to lock them in their adjusted positions by means of the lock nuts 22, and yet they will not interfere with the general use of the gage by means of the pointer and scale 30, while always available for instant use when the said definite and accurate angles are needed.

Referring now to the modified form illustrated in Figs. 4, 5, 6 and 7, I show a similar gage having a body 1, and a bar 5 pivoted thereto, as in Fig. 1, the said bar having a post 58 at one end thereof, carrying a pointer 17 cooperating with the graduations 30 on the body 1, the said post being secured to the bar 5 in any desired manner, for example, by the securing means 44, here shown as a screw.

Figure 6:
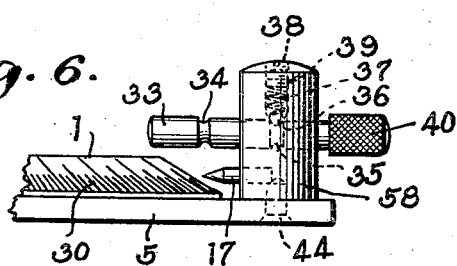
Fig. 6 is a fragmentary side elevation thereof.

The post 58 has a rod 33, which is preferably, but not necessarily, circular in cross section, passing transversely through the said post and having its axis parallel to the direction of the bar 5, as best shown in Figs. 4 and 6. This rod 33 is provided with two grooves, 34 and 35, either of which may cooperate with a retaining element, such as a ball 36, of suitable diameter to engage said groove and thus retain the rod 33 in its adjusted position. The retaining element 36 is urged into said groove by means of a spring or the like 37, arranged in a screw threaded aperture 39 in the post 58, and held therein by the screw 38, which may fit sufficiently tightly so that the tension of the spring may also be adjusted to a suitable degree, by adjusting the said screw. It will be obvious that the said retaining element 36 will snap into either the groove 34 or the groove 35 when said groove is below the same, and thus will retain the rod 33 in one of two definite positions, against any accidental derangement, while not preventing the rod from being forcibly adjusted in or out, by means of its knurled head 40, whenever the operator desires to do so.

The body 1 in this case likewise has the flange 2 and the cooperating lug 9 and rods 11 and 12, just as in the Fig. 1 form, and the bar 5 is here also securable at any desired position in the arcuate slot 13 by means of the screw 7. The lugs 47 employed as abutments in this form, to cooperate with the screws 23 and the lock nuts 22, differ slightly from the form shown in Fig. 1, although it is obvious that they might be the same as those of Fig. 1 in all respects, if preferred.

Figure 7:
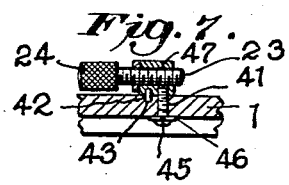
Fig. 7 is a partly sectional elevation, on the plane indicated by the line 7—7 of Fig. 4, showing the construction of an abutment or lug such as may be used in the Fig. 4 type of gage

However, to illustrate the fact that numerous different types of securing means may be used, a different form of attachment for the lugs 47 is illustrated in the Fig. 4 type of gage. This is best shown in Fig. 7, wherein the lug 47, threaded to receive the screw 23, having the knurled head 24, has a short pin 43 extending downwardly therefrom, and adapted to be received in a hole 42 of corresponding size, which may be any one of the holes 42, illustrated in Fig. 4, for example, and which holes may be located more or less arbitrarily at any suitable positions between the outer edge of the slot 13 and the beveled portion of the gage body 1. Another series of holes 41, here shown of larger diameter than the holes 42, for clearness of illustration, may be provided in said body 1, each hole 41 being definitely spaced with respect to its companion hole 42, so that when the pin 43 of a lug 47 is properly seated in its hole 42, the other hole 41 will be in the proper position to receive a screw 45, which may be provided with a washer 46, bearing against the under surface of the body 1, and which is screw threaded into the lug 47, as shown in Fig. 7, to hold the lug firmly in proper position. It will be noted that the pin 43 in combination with the screw 45 will definitely hold the lug 47 in a rigid and accurate position with respect to the body 1, the screw 45 serving the holding function and the pin 43 serving to prevent rotation of the lug 47 about said screw 45 when the same is tightened.

The same function is served by the polygonal openings 26 and the polygonal extensions 27 of the Fig. 1 type. It will be noted that in this type of gage, instead of the swinging link 18, I have provided the slidable rod 33, to cooperate with the screws 23 for suitably positioning the bar 5 at the desired angles. The adjustment of the positions of said screws 23 in their respective lugs 47 may be accomplished just as described in connection with the Fig. 1 form, and the stop rod 33 may be put in service by placing it in the position shown in Figs. 4 and 6, and may be put out of service by simply withdrawing it until the groove 34 cooperates with the ball 36, when the gage will operate in the ordinary manner by means of the pointer and the graduations 30.

As stated, any desired number of abutments or lugs 47 may be used, and of course, the number of apertures, such as 41 and 42, also may be as large as preferred. The limit will obviously be attained when the holes are so close together that they would overlap one another if brought still closer. A desirable embodiment would comprise a continuous set of uniformly spaced holes, any two of which could cooperate with the pin 43 and the screw 45 of any lug 47. In this case the holes 41 and 42 should preferably all be of the same diameters and alike in all respects, and holes 42 should, of course, also extend all the way through the body 1, so that they could receive the screws 45. Such close spacing of the holes would make it possible to set the abutments 47 and screws 23 so as to be adjustable to provide any angular setting whatever of the bar 5, within the range of the instrument.

Referring now to the third embodiment of my invention, illustrated in Figs. 9 to 13, I again show a gage comprising two members 5 and 6 respectively. The member 5, as before, is a bar having parallel straight edges, and the body member 6 of the gage is substantially similar to the body 1 of the preceding forms, with the exception that the body 6 does not have a beveled front portion but is of the shape shown in elevation in Figs. 10 and 11 and in cross section in Fig. 13. In this form the graduations 31 are placed upon a substantially plane surface at the top of the body 6, as shown. The slot 13 and screw 7, cooperating with the bar 5, serve, as before, to permit the bar 5 to be adjusted to any desired angle and then clamped in position. The gage rod 11 and the securing screw 49 therefor, as well as a lug 10, corresponding to the lug 9 of the prior forms, may be provided as in said other types. In this form it is preferred to provide a link 51 hingedly secured to the bar 5, by means of a pin 53, about which it can pivot into the full line position shown in Figs. 9, 10 and 11 or into the dotted line position shown in Fig. 11, the link being in active condition when in the full line position, and being out of service when in the dotted line position.

Here again the screws 23 may be provided, having the knurled heads 24 and the screw slots 25, if desired, adapted to cooperate with the lugs 50, and provided with the lock nuts 22 to secure the screws in their adjusted positions. The lugs 50 may, of course, be made integral with the body 6 of the gage, if desired, but it is preferred to provide means for securing them at selected variable positions which will now be described.

The body 6 in this modification has a hemi-cylindrical depending flange, of the shape best shown in Fig. 13, and as shown in horizontal section in Fig. 12. This flange may be provided with a series of any desired number of apertures, here shown as round holes 52 appearing on Figs. 10, 11 and 12. A screw 54 may be threaded into a tapped hole 55 in the lug 50, as best shown in Fig. 12. It will be noted that the contacting surfaces of the lug 50 and of the flange of the body 6 are cylindrical arcs of equal radii, so that they will fit closely together and thus automatically prevent any relative turning when the screw 54 is tightened. In this form the pointer 48, which is secured to the bar 5, is preferably slanted, as shown in Fig. 9, to avoid interference of the parts.

It will also be noted on comparing Fig. 13 with Fig. 3, that while the downwardly extending flange on the body 1 adjacent the slot 13 extends down to the same plane as the top of the bar 5, this is not true in the case of Fig. 13. Obviously, by having the flange extend into contact with the upper surface of the bar 5, all springing of the body 1 will be prevented when the screw 7 is tightened. However, it is not essential to provide such extreme rigidity in all cases, and, therefore, by way of illustration, Fig. 13 shows the flange on the body 6 around the slot 13 extending down only a short distance. This saves considerable weight and material, which is relatively expensive if the gage is made of die casting metal. A further advantage gained by thus terminating the flange away from the top surface of the bar 5 is that more ready access is provided to the screws 54 by means of a screw driver, if there is no obstructing flange at 13. If increased rigidity is necessary it may, of course, still be obtained by simply providing a spacing washer around the screw 7, between the body 6 and the bar 5, and of the correct thickness to fill the remaining space. When this washer is in place, it is clear that no springing of the body 6 or bar 5 can be produced by tightening the screw 7.

A point to be noted in connection with all the described forms of the present invention is that certain of the screws 23 will bear against the right hand face of the swinging or sliding abutment member, 18, 33 or 51, while certain others will bear against the left hand portion thereof, this depending entirely upon the direction in which the particular screw 23 happens to face. For example, in all the figures the two screws 23, appearing at the right hand side of the figures, will bear against the right hand face of the stop member, whereas the third screw 23 in each case, will bear against the left hand surface. This makes an apparent difference in the positioning of the screws 23, as indicated, for example, at the left in Fig. 1, where the corresponding screw 23 makes contact with the left surface of the member 18, shown in dotted line position. For this reason the end of this particular screw 23, while actually in line, or approximately in line, with the 50° division, will in fact correspond to a setting of 48°, due to the fact that the right hand surface of said member 18 in this embodiment is in line with the pointer 17. Similar considerations, of course, apply to the forms shown in Figs. 4 and 9. This, however, makes absolutely no difference in the setting of the gage, because the gage is set in every case, where accuracy is required, by employing a drafting triangle, try-square or other suitable implement.

It may further be desirable at this point to call attention to the fact that in order to prevent the retaining ball 36, of Fig. 6, from becoming lost if the rod 33 is accidentally or intentionally withdrawn entirely from the post 58, the threaded aperture 39, shown in Fig. 6, is preferably reduced, as shown, at its lower end, to a diameter too small to permit said ball 36 from falling entirely therethrough.

In operation it will be obvious that the gage may be used for all purposes in the ordinary way, by means of the scale 30 or 31, in cooperation with the pointer 17 or 48, as the case may be, except where great accuracy is desired or where it is desired to set the gage rapidly to certain much used angles. Such rapid setting is accomplished by swinging the stop element 18 or 51 about its pivot into position to engage the appropriate one of the screws 23, or by similarly pushing the rod 33 into the path of the said screws. If said screws have been adjusted, as described in the specification, so that accurate settings for definite angles will be produced when they abut against the said stop members, the desired angles will, of course, be produced automatically, and the gage may then be locked in its adjusted position, by means of the screw 7, as clearly described in the specification. In the forms where the abutments which hold the screws 23 are shiftable into selected positions, at will, this may, of course, be done by simply unscrewing the securing screws, such as 28, 45 or 54, shifting the lugs into position to cooperate with the desired apertures, and retightening the screws, whereupon the screws 23 may be adjusted for the correct angle and then secured into position against accidental derangement by the lock nuts 22.

It is, of course, obvious that the main portion or body member of my gage may be made of any suitable material, and while ordinarily metal, specifically die-cast metal, will be preferred, the invention is not to be restricted to the same and any other material, such as an artificial resin, for example a phenol-formaldehyde condensation product, may be employed if preferred.

It is obvious that while I have described various forms of my invention, the same is not necessarily limited to such particular forms, but may be varied as desired, and limited only by the scope of the following claims.

Having thus described several embodiments of my invention and explained some of the advantages thereof,

I claim:

1. A protractor having a graduated base, a bar pivoted to the said base, the graduations being arranged substantially on a circular arc and the pivot of the bar being substantially at the center of the said arc, a member adjustably supported by said bar adjacent the graduations, a plurality of gaging stops, means for securing said stops to the base, each stop comprising an adjustable abutment, said abutment being within the path of the said adjustably supported member when it is moved in one sense with respect to the bar and being clear of said path when the adjustably supported member is moved in the other sense.

2. A protractor having a graduated base, a bar pivoted to the said base, the graduations being arranged substantially on a circular arc and the pivot of the bar being substantially at the center of the said arc, a member hingedly supported by said bar adjacent the graduations, a plurality of gaging stops, means for securing said stops to the base, each stop comprising an adjustable abutment, said abutment being within the path of the said hingedly supported member when it is swung in one direction about its hinge, and being clear of the said path when the hingedly supported member is swung in the other direction.

3. A protractor having a graduated base, a bar pivoted to the said base, the graduations being arranged substantially on a circular arc and the pivot of the bar being substantially at the center of the said arc, a member slidably supported by said bar adjacent the graduations, a plurality of gaging stops, means for securing said stops to the base, each stop comprising an adjustable abutment, said abutment being within the path of the said slidably supported member when it is slid in one direction with respect to the bar and being clear of said path when the slidably supported member is slid in the other direction.

4. A protractor having a graduated base, a bar pivoted to the said base, the graduations being arranged substantially on a circular arc and the pivot of the bar being substantially at the center of the said arc, a support secured to the bar adjacent the graduations, a member slidably held in said support, means for retaining said member in its adjusted position in said support, a plurality of gaging stops, means for securing said stops to the base, each stop comprising an adjustable abutment, said abutment being within the path of the said slidable member when it is slid in one direction with respect to the bar and being clear of said path when the slidable member is slid in the other direction.

5. A protractor having a graduated base, a bar pivoted to the said base, the graduations being arranged on a circular arc, and the pivot of the bar being at the center of the said arc, a support secured to the bar adjacent the graduations, a member slidably adjustable in said support, resilient means for retaining said member in its adjusted position in said support, a plurality of gaging stops, means for securing said stops to the base, each stop comprising an adjustable abutment, said abutment being within the path of the said slidable member when it is slid in one direction with respect to the bar and being clear of said path when the slidable member is slid in the other direction.

6. A protractor comprising a substantially semicircular base, said base having a transverse plane surface at the straight part of the semicircle, said base also having graduations thereon disposed substantially along an arc of a circle, a straight-edge bar pivotally secured to said base at an axis passing through the center of the said circle, an indicator carried by said straight-edge bar to cooperate with the said graduations and thus indicate the angular position of the straight-edge bar with respect to the said transverse surface, a stop element pivotally secured to said straight-edge bar near one end thereof and adjacent the arcuate portion of the semicircle, and at least one cooperating abutment carried by the base to be engaged by the stop element.

7. A protractor comprising a substantially semicircular base having a curved flange along its arcuate edge, a bar pivoted to said base, a stop-element carried by said bar adjacent the said flange, and an adjustable abutment removably secured to the said flange to cooperate with the stop-element.

8. A protractor comprising a substantially flat, semicircular base having a substantially hemicylindrical flange extending transversely to the said base at its curved edge, said flange having at least one perforation therein, a bar pivoted to the base, one end of said bar extending beyond the flange, a stop element pivoted to said end of the bar, at least one abutment cooperating with said stop element, said abutment having an attachment surface curved to conform to the cylindrical flange, and a removable securing means passing through the perforation and into the abutment to hold the same in position.

9. A protractor comprising a substantially semicircular base, said base having a transverse plane surface at the straight part of the semicircle, said base also having graduations thereon disposed substantially along an arc of a circle, a straight-edge bar pivotally secured to said base at an axis passing through the center of the said circle, an indicator carried by said straight-edge bar to cooperate with the said graduations and thus indicate the angular position of the straight-edge bar with respect to the said transverse surface, a stop element pivotally secured to said straight-edge bar near one end thereof and adjacent the arcuate portion of the semicircle, and at least one cooperating abutment adjustably secured to the base to be engaged by the stop element.

10. A geometrical instrument comprising a member having a flange which is bounded by a portion of a convex cylindrical surface and an abutment comprising a lug having a correspondingly curved concave cylindrical surface, and having a threaded bore therein extending in a direction substantially parallel to a line tangent to the said concave cylindrical surface at its center, an abutment screw, threaded into said bore, and means for securing the lug rigidly to the correspondingly curved convex cylindrical portion of the instrument, and means pivoted to the said member and having a stop cooperating with the said screw.

11. A geometrical instrument comprising a member having a flange which is bounded by a portion of a convex cylindrical surface and an abutment comprising a lug having a correspondingly curved concave cylindrical surface, and having a threaded bore therein extending in a direction substantially parallel to a line tangent to the said concave cylindrical surface at its center, an abutment screw, threaded into said bore, and a single fastening element for securing the lug rigidly to the correspondingly curved convex cylindrical portion of the instrument, and means pivoted to the said member and having a stop cooperating with the said screw.

12. A mathematical instrument comprising two members which are pivotally secured to one another, one of said members having a scale graduated in units of angular measure thereon, and the other having an indicator cooperating with said scale to thus indicate the angular position of one of the members with respect to the other, at least one abutment, means for securing the same to one of the members at a definite position, and a stop secured to the other member in proper position to come into engagement with the abutment when a definite desired relative angular position of the two members exists said stop being adjustable with respect to the member carrying it, so that when desired it may be adjusted to permit the said stop-carrying member to move freely without causing the stop to strike an abutment.

13. A mathematical instrument comprising two members which are pivotally secured to one another, one of said members having a scale graduated in units of angular measure thereon, and the other having an indicator cooperating with said scale to thus indicate the angular position of one of the members with respect to the other, at least one adjustable abutment element, means for securing the same to one of the members at a definite position, and a stop secured to the other member in proper position to come into engagement with the abutment when a definite desired relative angular position of the two members exists, said adjustable abutment element comprising a stop-engaging abutment screw threaded thereinto, for providing the desired accuracy of adjustment.

14. A mathematical instrument comprising two members which are pivotally secured to one another, one of said members having a scale graduated in units of angular measure thereon, and the other having an indicator cooperating with said scale to thus indicate the angular position of one of the members with respect to the other, a plurality of abutments, means for securing the same to one of the members and a stop secured to the other member in proper position to come into engagement with the abutments when certain definite desired relative angular positions of the two members exist said stop being adjustable with respect to the member carrying it, so that when desired it may be adjusted to permit the said stop-carrying member to move freely without causing the stop to strike an abutment.

15. A mathematical instrument, comprising two members which are pivotally secured to one another, one of said members having a scale graduated in units of angular measure thereon, and the other having an indicator cooperating with said scale to thus indicate the angular position of one of the members with respect to the other, a plurality of abutments, means for securing the same to one of the members and an adjustable stop secured to the other member in proper position to come into engagement with the abutments when certain definite desired relative angular positions of the two members exist, when the stop is in one position with respect to the member to which it is secured and being clear of said abutments at all times when in another position with respect to said member, the member to which the abutments are to be secured having a plurality of apertures therein, and each abutment having its said securing means shaped to fit into any one of said apertures, whereby any one of the abutments may be secured to the member at any one of said apertures.

16. A protractor comprising a base, a bar pivoted to the said base, a member adjustably supported by said bar adjacent the base, and at least one gaging stop secured to the base, each stop comprising an adjustable abutment, said abutment being within the path of the said adjustably supported member when it is moved in one sense with respect to the bar and being clear of said path when the adjustably supported member is moved in the other sense.

17. A protractor comprising a substantially semicircular base, a bar pivoted to the said base, the pivot of the bar being substantially at the center of the semicircle, a member hingedly supported by said bar adjacent the base, and a plurality of gaging stops rigidly arranged on the base, each stop comprising an adjustable abutment, said abutment being within the path of the said hingedly supported member when it is swung in one direction about its hinge, and being clear of the said path when the hingedly supported member is swung in the other direction.

18. A protractor comprising a base, a bar pivoted to the said base, a member slidably supported by said bar adjacent the base, and at least one gaging stop integral with the base, each such stop comprising an adjustable abutment, said abutment being within the path of the said slidably supported member when it is slid in one direction with respect to the bar and being clear of said path when the slidably supported member is slid in the other direction.

19. A protractor comprising a base, a bar pivoted to the said base, a support secured to the bar adjacent the base, a member slidably held in said support, means for retaining said member in its adjusted position in said support, and a plurality of gaging stops secured rigidly to the base, each stop comprising an adjustable abutment, said abutment being within the path of the said slidable member when it is slid in one direction with respect to the bar and being clear of said path when the slidable member is slid in the other direction.

20. A protractor comprising a base, a bar pivoted to the said base, a support secured to the bar adjacent the base, a member slidably adjustable in said support, resilient means for retaining said member in its adjusted position in said support, and a plurality of gaging stops secured to the base, each stop comprising an adjustable abutment, said abutment being within the path of the said slidable member when it is slid in one direction with respect to the bar and being clear of said path when the slidable member is slid in the other direction.

21. A geometrical instrument comprising a base, a bar pivoted to said base, a member adjustably supported by said bar adjacent an edge portion of the base, a gaging stop on said base adjacent its said edge portion and comprising an adjustable abutment, said abutment being within the path of said adjustably supported member on the bar when said member is adjusted into one position with respect to the bar and being clear of said path when said adjustably supported member is moved into another position with respect to the bar.

22. A geometrical instrument comprising a base having an arcuate edge, a bar pivoted to said base at substantially the center of said arc, a member adjustably supported by said bar adjacent the arcuate portion of the base, a gaging stop secured to said base adjacent its arcuate portion and comprising an adjustable abutment, said abutment being within the path of said adjustably supported member on the bar when said member is adjusted into one position with respect to the bar and being clear of said path when said adjustably supported member is moved into another position with respect to the bar.

23. A geometrical instrument comprising a base, a bar pivoted to said base, a member adjustably supported by said bar adjacent an edge portion of the base, and an abutment on said base adjacent its said edge portion, said abutment being in the path of said adjustably supported member on the bar when said member is adjusted into one position with respect to the bar and being clear of said path when said adjustably supported member is moved into another position with respect to the bar.

24. A geometrical instrument comprising a base, a bar pivoted to said base, a member adjustably supported by said bar adjacent an edge portion of the base, and a plurality of abutments on said base adjacent its said edge portion, said abutments being in the path of said adjustably supported member on the bar when said member is adjusted into one position with respect to the bar and being clear of said path when said adjustably supported member is moved into another position with respect to the bar.

25. A geometrical instrument comprising a base having an arcuate edge and a bar pivoted to the said base, the pivot of the said bar being substantially at the center of the said arc, a member adjustably supported by the said bar adjacent said arcuate edge, a plurality of gaging stops secured to the base, each stop comprising an adjustable abutment, said abutment being within the path of the said adjustably supported member when said member is adjusted in one sense with respect to the bar and being clear of said path when the adjustably supported member is adjusted in the other sense.

In testimony that I claim the foregoing as my invention, I have signed my name thereto.

JAMES TATE.